(12) United States Patent
Harper

(10) Patent No.: US 7,563,069 B2
(45) Date of Patent: Jul. 21, 2009

(54) CLIP

(75) Inventor: Cedric B Harper, Derby (GB)

(73) Assignee: Rolls-Royce PLC, London (GB)

( * ) Notice: Subject to any disclaimer, the term of this patent is extended or adjusted under 35 U.S.C. 154(b) by 451 days.

(21) Appl. No.: 11/487,429

(22) Filed: Jul. 17, 2006

(65) Prior Publication Data

US 2007/0036644 A1  Feb. 15, 2007

(30) Foreign Application Priority Data

Aug. 13, 2005  (GB) ................... 0516662.4

(51) Int. Cl.
*F01D 21/00*  (2006.01)
(52) U.S. Cl. .................. 415/9; 415/173.1; 415/214.1
(58) Field of Classification Search .............. 415/9, 415/173.1, 173.4, 174.4, 214.1
See application file for complete search history.

(56) References Cited

U.S. PATENT DOCUMENTS 4,856,963 A * 8/1989 Klapproth et al. ........... 415/190
5,201,846 A * 4/1993 Sweeney ................. 415/173.6
6,468,026 B1 * 10/2002 Bonnoitt et al. ............. 415/9

FOREIGN PATENT DOCUMENTS

| GB | 767530 | 2/1957 |
| GB | 836121 | 6/1960 |
| GB | 849736 | 9/1960 |
| GB | 2 118 612 A | 11/1983 |
| GB | 2 160 579 A | 12/1985 |
| GB | 2 304 144 A | 3/1997 |
| GB | 2 386 922 A | 10/2003 |
| GB | 2 407 344 | 4/2005 |

* cited by examiner

*Primary Examiner*—Igor Kershteyn
(74) *Attorney, Agent, or Firm*—Oliff & Berridge, PLC

(57) ABSTRACT

A clip used to attach an acoustic panel to a fan casing of a gas turbine engine is "U" shaped. One arm of the clip is provided with a spacing portion cut into the material of the arm and which may be bent to define the spacing between the outer face of the arm and a support. An engagement portion, which may also be cut into the material of the clip, may be bent to engage a recess in a tenon inserted into the receiving portion.

14 Claims, 4 Drawing Sheets

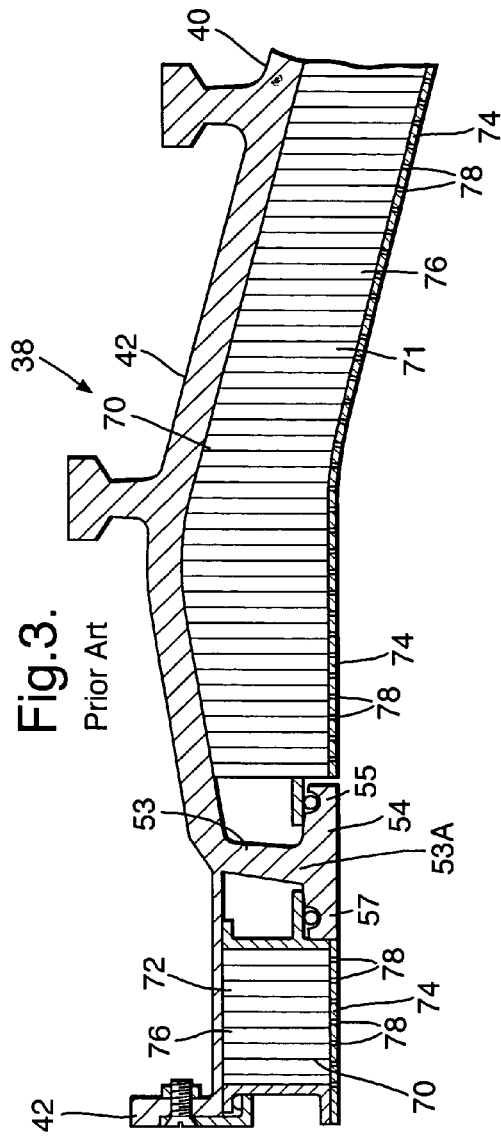
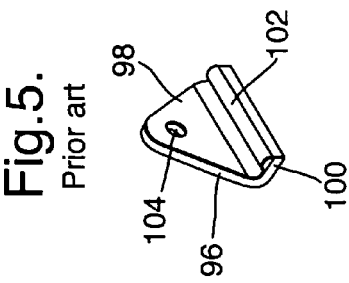
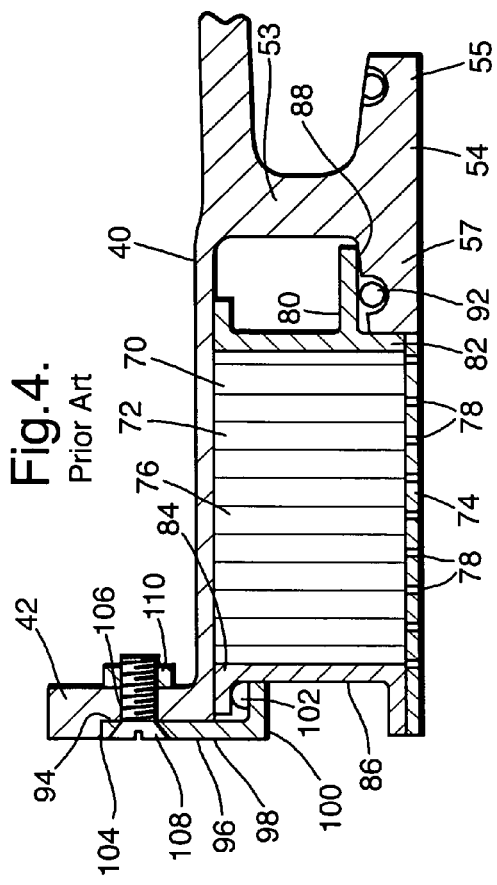

CLIP

This invention concerns a clip and in particular a clip for use in a gas turbine engine and for use to attach an acoustic profile to the fan case of a gas turbine engine.

BACKGROUND

Turbofan gas turbine engines for powering aircraft conventionally comprise a core engine, which drives a fan. The fan comprises a number of radially extending fan blades mounted on a fan rotor enclosed by a generally cylindrical fan casing.

The fan casing is provided with a hook axially upstream of the tips of the fan blades to prevent upstream movement of a detached blade. Upstream of the casing hook there is provided front acoustic panels that form the annulus profile forward of the casing hook.

Conventionally, the acoustic panels are either bolted to the casing or, where the casing for stress reasons cannot sustain the presence of radial holes, held in place by an 'o' ring and bracket arrangement.

Such an arrangement is disclosed in GB 2407344 (incorporated herein). A turbofan gas turbine engine 10, as shown in FIG. 1, comprises in flow series an intake 12, a fan section 14, a compressor section 16, a combustor section 18, a turbine section 20 and an exhaust 22. The turbine section 20 comprises one or more turbines arranged to drive one or more compressors in the compressor section 16 via shafts. The turbine section also comprises a turbine to drive the fan section 14 via the shaft. The fan section 14 comprises a fan duct 24 defined partially by a fan casing 26. The fan duct 24 has an outlet 28 at its axially downstream end. The fan casing 26 is secured to the core engine casing 36 by a plurality of radially extending fan outlet guide vanes 30. The fan casing 26 surrounds a fan rotor 32, which carries a plurality of circumferentially spaced radially extending fan blades 34. The fan rotor 32 and fan blades 34 rotate about the axis X of the gas turbine engine 10, substantially in a plane Y perpendicular to the axis X. The fan casing 26 also comprises a fan blade containment assembly 38, which is arranged substantially in the plane Y of the fan blades 34. The fan blades 34 have a leading edge 33, a trailing edge 35 and a tip 37.

The fan casing 26 and fan blade containment assembly 38 is shown more clearly in FIGS. 2 to 4. The fan blade containment assembly 38 comprises a metal cylindrical, or frusto-conical, casing 40. The metal casing comprises an upstream flange 42 by which the fan blade containment assembly 38 is connected to a flange on an intake assembly of the fan casing. The metal casing comprises a downstream flange 44 by which the fan blade containment assembly 38 is connected to a flange on a rear portion of the fan casing 26. The metal casing 40 comprises an annular T-shaped member, or hook, 54 that is positioned axially upstream of the leading edge 33 of the tip 37 of the fan blade 34. The annular member 54 comprises a first portion 53 which extends in a radially inwardly direction from the metal casing 40, a second portion 55 which extends in an axially downstream direction from the radially inner end 53A of the first portion 53 of the annular member 54 towards the tip 37 of the fan blade 34 and a third portion 57 which extends in an axially upstream direction from the radially inner end 53A of the first portion 53 of the annular member 54 towards the intake assembly 46. The annular member 54 is substantially in a plane perpendicular to the axis X of the gas turbine engine 10, upstream of the most upstream point of the leading edge 33 of the fan blades 34.

A liner 70 is provided radially within the metal casing 40 and there are two types of liner 70, an acoustic liner 72 to reduce noise and a fan blade track panel 71 arranged around the fan blades 34 to form an abradable seal.

The acoustic liner generally comprises a plurality of acoustic panels 72, which are arranged circumferentially and axially along the inner surface of the metal casing 40. Each acoustic panel 72 comprises a perforated skin 74 and a structure 76 to form an acoustic treatment structure. The perforated skin 74 has a plurality of perforations 78.

The perforated skin 74 of each acoustic panel 72 comprises aluminium, titanium or composite material, for example fibre reinforced plastic e.g. glass fibre reinforced epoxy resin. The structure 76 comprises a honeycomb structure, for example an aluminium honeycomb, a titanium honeycomb, a composite material honeycomb, a resin impregnated paper honeycomb or other suitable honeycomb.

The composite material honeycomb may comprise fibre reinforced plastic e.g. glass fibre reinforced epoxy resin. The panels of the liner 70 are secured to the metal casing 40 by various means. A circumferentially arranged set of acoustic panels 72 is arranged upstream of the annular member 54. The acoustic panels 72 are secured to the metal casing 40 by an axially extending tenon 80 on the axially downstream end 82 of each acoustic panel 72 and an axially extending member 84 on the axially upstream end 86 of each acoustic panel 72, as shown more clearly in FIGS. 4 and 5. The axially extending members or tenons 80 extend in an axially downstream direction radially outward of the axially extending third portion 57 of the annular member 54 and thus secure the downstream ends 82 of the acoustic panels 72A.

In the prior art an annular resilient sealing member, for example a rubber, or silicone, sealing member, 92 is located in an annular groove 90 on the radially outer surface 88 of the third portion 57 of the annular member 54. The annular resilient sealing member 92 thus biases the axially extending members or tenons 80 and the axially downstream ends 82 of the acoustic panels 72A radially outwardly into contact with the inner surface of the casing 40.

The flange 42 of the casing 40 has a plurality of circumferentially spaced recesses 94 on the face arranged to abut the flange 48 of the intake assembly 46. A plurality of L-shaped brackets 96 are provided and each L-shaped bracket 96 fits in one of the recesses 94 on the face of the flange 42 and each L-shaped bracket 96 is arranged flush with the face of the flange 42. Each L-shaped bracket 96 comprises a radially extending portion 98 and an axially extending portion 100. The axially extending portion 100 extends in an axially downstream direction and the axially extending members 84 extend in an axially upstream direction radially outwardly of the axially extending portions 100 of the L-shaped brackets 96 to secure the upstream ends 86 of the acoustic panels 72.

Each L-shaped bracket 96 has a resilient member, for example a rubber, or silicone, resilient member 102 located on the radially outer surface of the axially extending portion 100 of the L-shaped bracket 96. The resilient members 102 thus bias the axially extending members 84 and the axially upstream ends 86 of the acoustic panels 72 radially outwardly into contact with the inner surface of the casing 40. The radially extending portion 98 of each L-shaped bracket 96 has a countersunk aperture 104 arranged coaxially with one of a plurality of circumferentially arranged apertures 106 in the flange 42 of the casing 40.

The L-shaped brackets 96 are secured to the flange 42 of the casing 40 by countersunk headed bolts, or screws, 108 passing through the apertures 104 and 106 in the L-shaped brackets 96 and flange 42 and respective nuts 110.

The acoustic panels 72 are installed by moving them in an axially downstream direction so that the axially extending members or tenons 80 locate on the radially outer surface 88 of the third portion 57 of the annular member 54. The L-shaped brackets 96 are located in the recesses 94 in the surface of the flange 42 and the axially extending portions are positioned radially inwardly of the axially extending members 84 so that the axially extending members 84 locate on the axially extending portions 100 of the L shaped brackets 96. The bolts, or screws, 108 are inserted through the apertures 104 and 106 in the L-shaped brackets 96 and flange 42 and threaded into the nuts 110.

The acoustic panels 72 are removed by unthreading the s bolts, or screws, 108 from the nuts 110, removing the bolts 108 from the apertures 104 and 106 and removing the L-shaped brackets 96 from the recesses 94 in the flange 42.

The acoustic panels 72 are removed by moving them in an axially upstream direction so that the axially extending members or tenons 80 no longer locate on the radially outer surface 88 of the third portion 57 of the annular member 54.

Preferably the L-shaped brackets 96 comprise a suitable metal or other suitable material. Other suitable shapes of bracket may be used.

Each acoustic panel 72 may be secured at its axially upstream end 86 by a single L-shaped bracket 96, which extends through a substantial portion, or the full length, of the axially upstream end 86 of each acoustic panel 72 respectively. Alternatively each acoustic panel 72 may be secured at its axially upstream end 86 by a plurality of L-shaped brackets 96 which are spaced apart along the length of the axially upstream end 86 of each acoustic panel 72 respectively.

The advantage of this embodiment is that it allows the acoustic liners to be easily installed, inserted, and removed from the casing. However, gas turbine engines are often built in a vertical attitude. The annular resilient sealing member 92 is an 'o' ring that can be expensive and can be up to 10 m in length. The flexibility of the 'o' ring means that it tends to want to fall out of the machined groove during assembly. Two people are therefore required to provide a satisfactory build.

Additionally, the axial position of each acoustic panel can vary and frettage may occur between the rail and the casing forward of the 'o' ring.

SUMMARY

It is an object of the invention to seek to address these and other problems.

According to the invention there is provided a gas turbine engine casing comprising a generally cylindrical, or frusto-conical, casing, the casing including at least one mounting member, the or each mounting member having a first portion extending radially from the casing and a second portion extending axially from the first portion of the member, at least one liner panel being positioned radially from the casing, a first end of the liner panel being locatable on the second portion of the member by a clip comprising platform means having an inward face and an opposing outward face, the clip carrying a portion of the liner panel on the inward face and having engagement means for engaging the portion of the liner panel carried on the inward face and wherein the platform means is provided with at least one spacing means which may be bent to support the outward face at a selected spacing from the second portion of the member.

Preferably the spacing means comprise at least one hinged tab formed in the platform means.

The engagement means may have a hinged tab that may be bent to engage the portion of the liner panel.

Preferably the engagement means has a screw that may be rotated to engage the portion of the liner panel.

Preferably the engagement means and the platform means, along with a base extending therebetween, defines a "U" shape in cross-section.

The portion of the liner panel may have a recess, which the engagement means may engage.

Preferably the mounting member is annular and the second portion extends axially forwards of the first portion and has a radially outer surface, the spacing means supporting the outer face of the clip at a selected spacing from the radially outer face of the second portion.

The clip may have a locating feature arranged orthogonally to the platform means and the second portion further has a radially extending face at its axially forward end and against which the locating feature of the clip abuts.

Preferably the portion of the liner panel is an axially extending tenon which extends the full length of the first end of the liner panel.

The portion of the liner panel may comprise a plurality of axially extending tenons spaced apart on the first end of the liner panel.

The clip may be annular. The liner panel may be an acoustic panel or a rotor blade track panel.

BRIEF DESCRIPTION OF THE DRAWINGS

Preferably each acoustic panel comprises a perforated skin and a structure to form an acoustic treatment structure. The casing may be a fan casing.

Embodiments of the present invention will now be described by way of example only and with reference to the accompanying drawings, in which:

FIG. 3 is a further enlarged cross-sectional view of the fan casing shown in FIG. 2.

FIG. 4 is an enlarged cross-sectional view of an acoustic panel shown in FIG. 3.

FIG. 5 is a perspective view of a bracket shown in FIG. 4.

DETAILED DESCRIPTION OF THE EMBODIMENT

Figure 1:
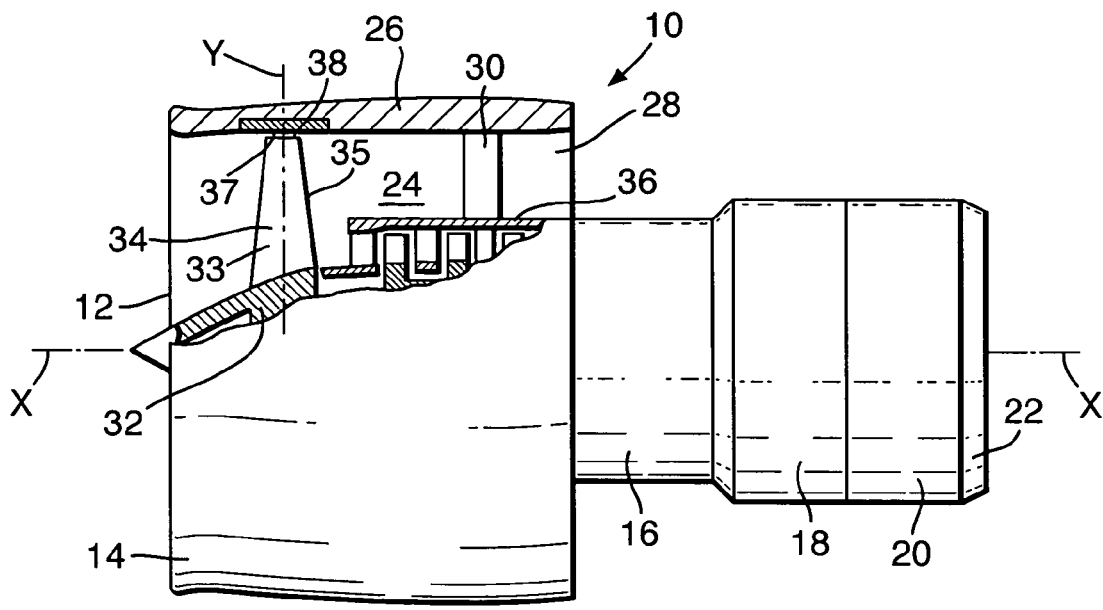
FIG. 1 is a partially cut away view of a gas turbine engine having a fan casing according to the prior art.
Figure 2:
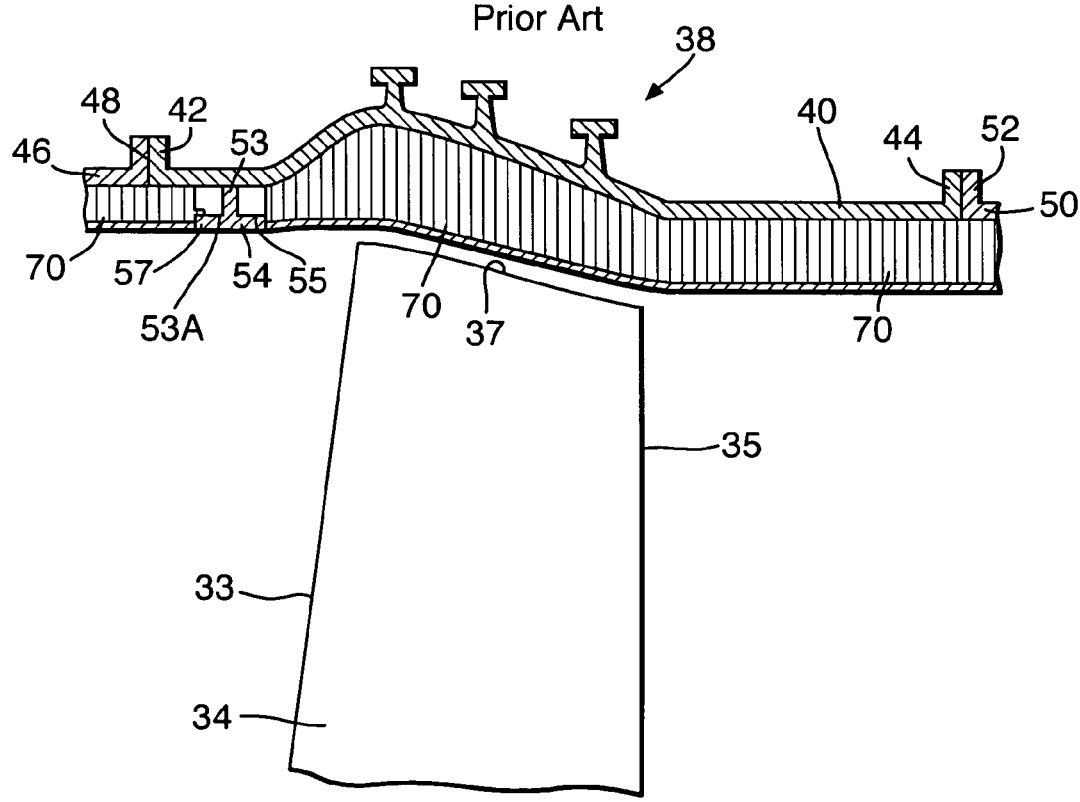
FIG. 2 is an enlarged cross-sectional view of the fan casing shown in FIG. 1.

For ease of reference, where possible, the reference numerals between embodiments have been kept the same for corresponding elements.

Figure 6:
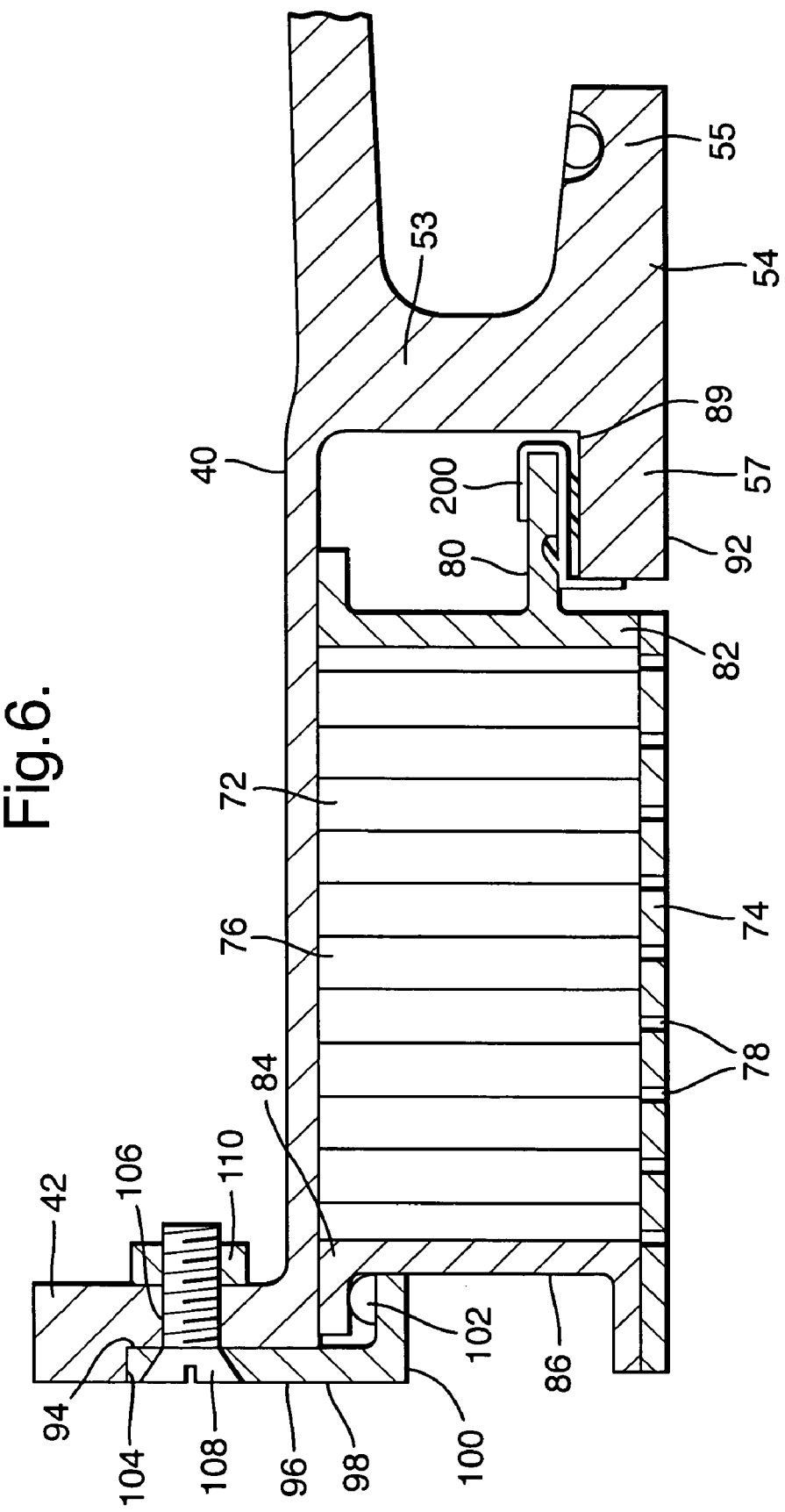
FIG. 6 is an enlarged cross-sectional view of an acoustic panel with a clip according to the present invention.
Figure 7:
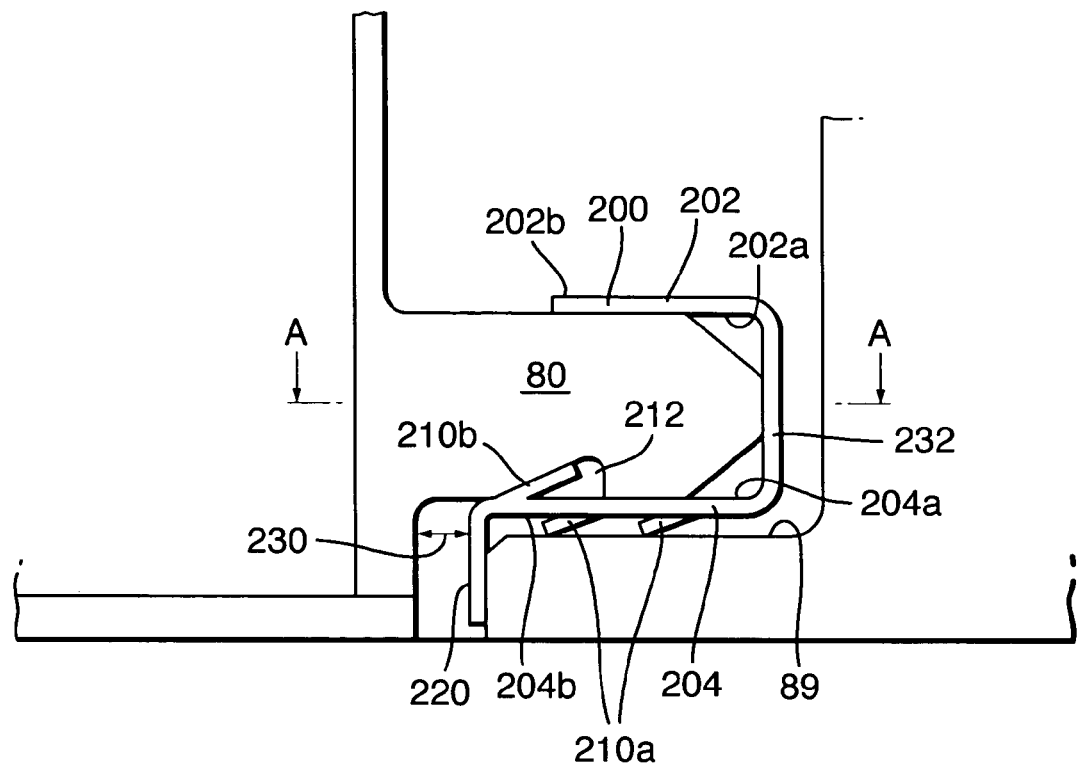
FIG. 7 is an enlarged view of the clip of the present invention.

With reference to FIG. 6, an acoustic liner 72 is provided radially within the metal casing 40 to reduce noise. The acoustic liner 72 generally comprises a plurality of acoustic panels, which are arranged circumferentially and axially along the inner surface of the metal casing 40. Each acoustic panel comprises a perforated skin 74 and a structure 76 to form an acoustic treatment structure. The perforated skin 74 has a plurality of perforations 78.

The perforated skin 74 of each acoustic panel 72 comprises aluminium, titanium or composite material, for example fibre reinforced plastic e.g. glass fibre reinforced epoxy resin. The structure 76 comprises a honeycomb structure, for example an aluminium honeycomb, a titanium honeycomb, a composite material honeycomb, a resin impregnated paper honeycomb or other suitable honeycomb.

The composite material honeycomb may comprise fibre reinforced plastic e.g. glass fibre reinforced epoxy resin.

The panels of the liner are secured to the metal casing 40 by various means. The acoustic panels 72 are secured to the metal casing 40 by an axially extending tenon 80 on the axially downstream end 82 of each acoustic panel 72 and a further axially extending member 84 on the axially upstream end 86 of each acoustic panel 72. The axially extending members or tenons 80 extend in an axially downstream direction radially outward of the axially extending third portion 57 of the annular member 54 and thus secure the downstream ends 82 of the acoustic panels 72.

The axially extending third portion 57 of the annular member 54 has a radially outer surface 89 that is planar and acts as a mounting member for the clip 200.

The clip 200 is a birdmouth type clip having a U shaped cross section with parallel arms 202,204. Each arm has an inward face 202a, 204a that faces towards the inward face of the opposing arm and an outward face 202b, 204b facing away from the opposing arm.

The clip is located radially outside the mounting member 89 with a second arm 202 located further radially outside the mounting member 89 than the first arm 204. The first arm is the radially inboard arm and the second arm is the radially outboard arm.

The inboard arm is provided with a series of cut out sections 201a, 210b that may be bent radially inboard (sections 210a) towards the engine axis or outboard (sections 201b) away from the engine axis. The sections 210a that are bent radially inboard form spacing means that serve to locate the outward face of the arm containing the cut out sections at a predetermined spacing from the mounting member 89. The spacing being predetermined by the amount the cut out is bent from the plane of the outward face.

Where the cut out sections 210b are bent outboard they serve to engage a recess 212 provided in the tenon 80 of the acoustic panel that is inserted into the clip 200. The tenon is therefore inhibited from being removed from the clip. It will be appreciated that the arms 202, 204 of the clip may be sprung to inhibit removal of the tenon without it being necessary to provide the cut-out sections 210b that are bent radially outboard.

The inboard arm 204 is provided with a locating feature 220 that extends orthogonally to the outward face of that arm.

Figure 8:
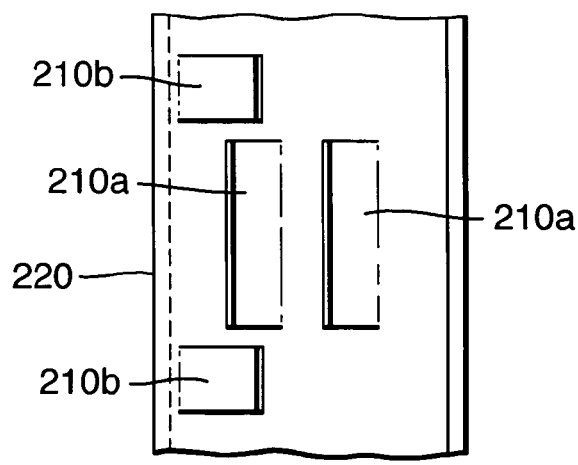
FIG. 8 is a view on A-A of the clip with the tenon removed.

FIG. 8 is a view on A-A of the clip with the tenon removed. The cut out sections are formed by cutting all but one side of a rectangle, with the fourth side acting as a hinge. The cut out sections may extend the length of the clip, or along part of the clip. Though rectangles have been shown other shapes may be used including, but not limited to, square, triangular etc.

The clip is formed by laser cutting or punching a sheet of a metal such as steel or titanium, which is then profiled via a press brake machine. The cut out sections may also be formed during the cutting process.

The cut out sections that form the spacing means are bent from the plane of the arm in which they are formed and a tenon from the acoustic panel is inserted into the clip. The engagment means are bent to engage a recess in the tenon thereby securing the tenon to the clip. The recess in the tenon may a groove extending the length of the acoustic panel, or one or a plurality of shorter recesses may be provided.

The tenon has a length that is greater than that of the clip. The locating face is therefore spaced from the moulded rail of the acoustic panel by a controlled gap 230 that beneficially eliminates frettage between the fan casing and the acoustic panel once the panel is inserted into the engine.

The locating member 220 abuts the fan case and ensures that each acoustic panel is at the same axial position as the other acoustic panels. The locating face also ensures that the base of the U shaped clip 232 between the two arms 202,204 does not press against the fan case 40.

The acoustic panels 72A are installed by first attaching the clip to the tenon 80 after the cut-out sections 210a are bent to form the spacing members. The engaging member 210b is then bent to engage the recess 212 of the tenon. The panel and clip combination is inserted in an axially downstream direction such that the radially extending locating member 220 locates on a radially extending face of the third portion 57 of the annular member 54.

The spacing means locate on the radially outer surface 89 of the third portion 57 of the annular member 54 and locate the outer face of the clip at a predetermined spacing from the radially outer surface 89 of the third portion 57 of the annular member 54.

The L-shaped brackets 96 are located in the recesses 94 in the surface of the flange 42 and the axially extending portions are positioned radially inwardly of the axially extending members 84 so that the axially extending members 84 locate on the axially extending portions 100 of the L shaped brackets 96. The bolts, or screws, 108 are inserted through the apertures 104 and 106 in the L-shaped brackets 96 and flange 42 and threaded into the nuts 110.

Various modifications may be made without departing from the scope of the invention.

For example, though the clip has been described with reference to being formed of titanium, it will be appreciated that other metals or even other materials may be used without departing from the inventive concept.

It will be appreciated that the clip may be manufactured easily and cheaply by the cutting and profiling method.

The metal casing may be manufactured from titanium, titanium alloy, aluminium, aluminium alloy, nickel, nickel alloy and steel. Alternatively the casing may be manufactured from a composite material or other suitable material.

The present invention has been described with reference to a fan casing, however it is equally applicable to a compressor casing and a turbine casing.

Although the present invention has been described with reference to the use of an annular member with an axially extending portion to retain the axially downstream ends of the set of acoustic panels it may be possible to arrange for an annular member with an axially extending member or tenon to retain the axially upstream end of the set of acoustic panels.

Although the present invention has been described with reference to the use of brackets to support one axial end of the acoustic liners it may be possible to use other suitable means for example radial fasteners, nuts and bolts although this may reduce the benefits of the present invention.

The present invention has described the annular member as being T-shaped in cross-section, the annular member may be T-shaped in cross-section in order to support acoustic panels axially upstream and axially downstream of the annular member or the annular member may be L-shaped in crosssection to support acoustic panel panels either axially upstream or axially downstream of the annular member.

It may be possible to provide a plurality of circumferentially arranged members which have radially inwardly and axially extending portions to retain the liner panels rather than an annular member.

It may be possible for a cassette to carry one or more acoustic panels or one or more fan blade track panels.

Beneficially, the mounting member does not require a groove to house an 'o' ring. Consequently, the machining and manufacturing costs for the casing 40 is reduced.

I claim:

1. A gas turbine engine casing comprising:
   a generally cylindrical, or frustoconical, casing, the casing including:
   at least one mounting member, the or each mounting member having a first portion extending radially from the casing and a second portion extending axially from the first portion of the member,
   at least one liner panel being positioned radially from the casing, and
   a first end of the liner panel being locatable on the second portion of the member by a clip comprising a platform having an inward face and an opposing outward face, the clip carrying a portion of the liner panel on the inward face and having engagement means for engaging the portion of the liner panel carried on the inward face, wherein the platform is provided with at least one spacing means which may be bent to support the outward face at a selected spacing from the second portion of the member.

2. A gas turbine engine casing according to claim 1, wherein the spacing means comprise at least one hinged tab formed in the platform.

3. A gas turbine engine casing according to claim 1, wherein the engagement means has a hinged tab that may be bent to engage the portion of the liner panel.

4. A gas turbine engine casing according to claim 1, wherein the engagement means has a screw that may be rotated to engage the portion of the liner panel.

5. A gas turbine engine casing according to claim 1, wherein the engagement means and the platform, along with a base extending therebetween, defines a "U" shape in cross-section.

6. A gas turbine engine casing according to claim 1, wherein the portion of the liner panel has a recess for receiving a tab or a screw.

7. A gas turbine engine casing as claimed claim 1, wherein the mounting member is annular and the second portion extends axially forwards of the first portion and has a radially outer surface, the spacing means supporting the outer face of the clip at a selected spacing from the radially outer face of the second portion.

8. A gas turbine engine casing according to claim 1, wherein the clip has a locating feature arranged orthogonally to the platform and the second portion further has a radially extending face at its axially forward end and against which the locating feature of the clip abuts.

9. A gas turbine engine casing as claimed in claims 1 wherein the portion of the liner panel is an axially extending tenon which extends the full length of the first end of the liner panel.

10. A gas turbine engine casing as claimed in claim 1 wherein the portion of the liner panel comprises a plurality of axially extending tenons spaced apart on the first end of the liner panel.

11. A gas turbine engine casing as claimed in claim 1 wherein the clip is annular.

12. A gas turbine engine casing as claimed in claim 1 wherein the liner panel is an acoustic panel or a rotor blade track panel.

13. A gas turbine engine casing as claimed in claim 12 wherein each acoustic panel comprises a perforated skin and a structure to form an acoustic treatment structure.

14. A gas turbine engine casing as claimed in claim 1 wherein the casing is a fan casing.

* * * * *